No. 662,598. Patented Nov. 27, 1900.
W. O. KNOWLSON.
WATER LINE GAGE FOR STEAM BOILERS.
(Application filed July 30, 1900.)
(No Model.) 3 Sheets—Sheet 1.
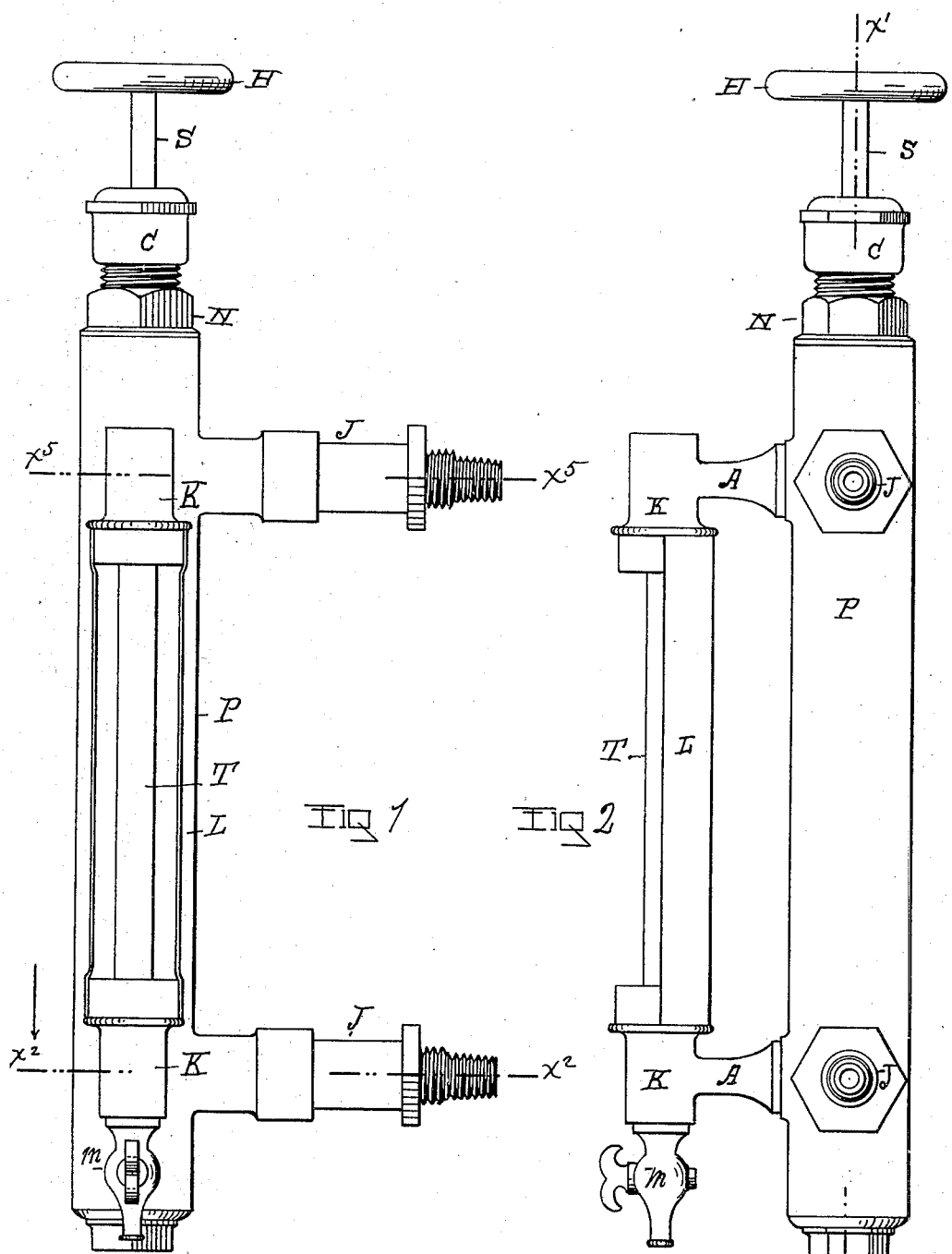

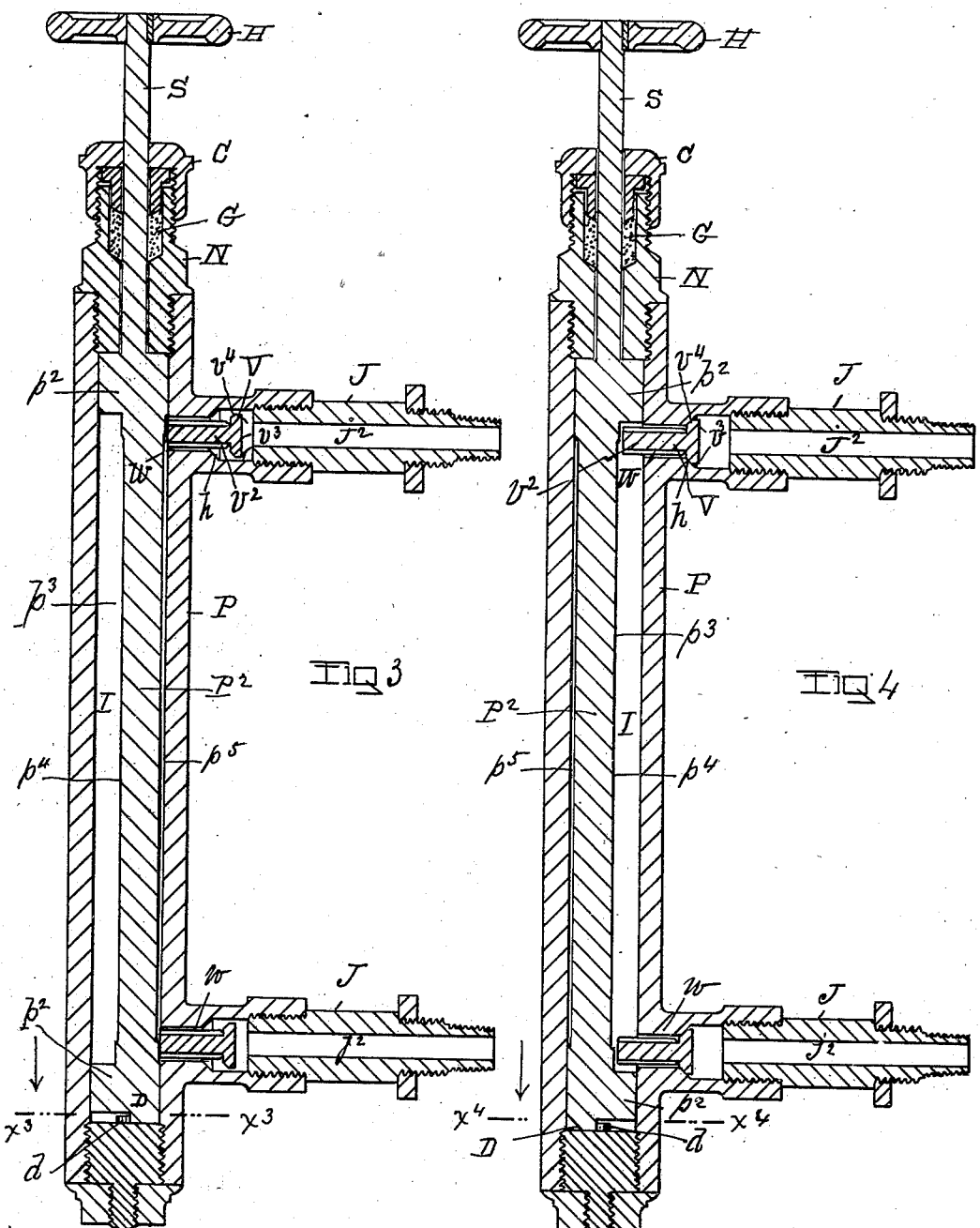

No. 662,598. Patented Nov. 27, 1900.
W. O. KNOWLSON.
WATER LINE GAGE FOR STEAM BOILERS.
(Application filed July 30, 1900.)

(No Model.) 3 Sheets—Sheet 3.

WITNESSES
William A. Sweet
Charles S. Brintnall

INVENTOR
Walter Osgood Knowlson
by W E Hagan atty

THE NORRIS PETERS CO., PHOTO-LITHO., WASHINGTON, D. C.

UNITED STATES PATENT OFFICE.

WALTER OSGOOD KNOWLSON, OF TROY, NEW YORK, ASSIGNOR OF ONE-HALF TO ALONZO McCONIHE, OF SAME PLACE.

WATER-LINE GAGE FOR STEAM-BOILERS.

SPECIFICATION forming part of Letters Patent No. 662,598, dated November 27, 1900.

Application filed July 30, 1900. Serial No. 25,270. (No model.)

*To all whom it may concern:*

Be it known that I, WALTER OSGOOD KNOWLSON, of the city of Troy, county of Rensselaer, State of New York, have invented new and useful Improvements in Water-Line Gages for Steam-Boilers, of which the following is a specification.

My invention relates to improvements in water-line gages for use upon steam-boilers, and more particularly their adaptation to the boilers of steam-engines operating automobile vehicles, launches, and other engines performing similar duty.

The object of my invention is to combine with water-line gages of that class having valves that automatically close when the indicating glass tube becomes broken a means whereby the valves of the apparatus when in use may be tested to determine whether they are in working order.

Accompanying this specifiation to form a part of it there are three plates of drawings containing ten figures illustrating the application of my invention, with the same designation of parts by letter reference used in all of them.

Figure 5:
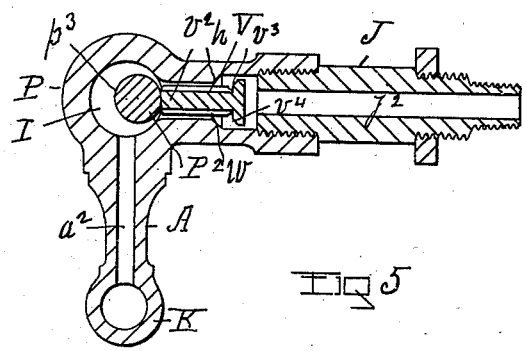
Figure 9:
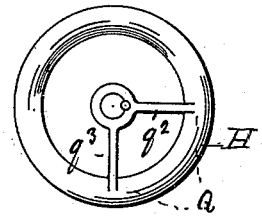
Figure 6:
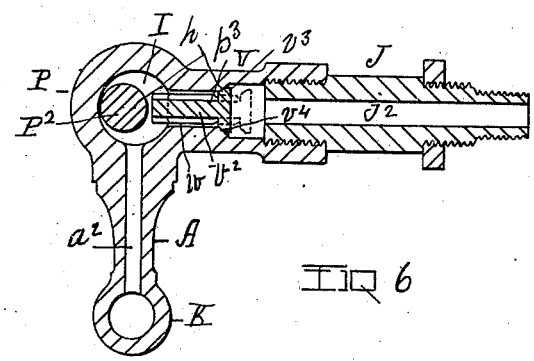
Figure 10:
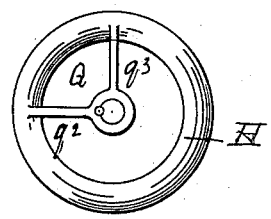
Figure 8:
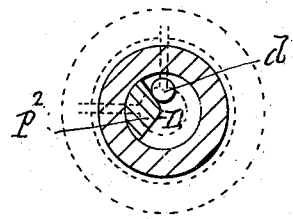
Figure 7:
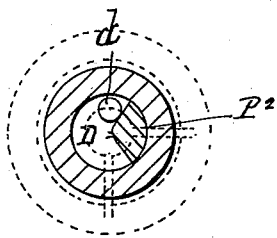

Of the illustrations, Figure 1 is a side elevation of a water-line gage containing my invention with the device shown as detached from the boiler with which it connects when in use. Fig. 2 is another elevation of the apparatus with the water-line glass tube of the device illustrated as facing the view. Fig. 3 is a central vertical section taken on the line $x'\ x'$ of Fig. 2, with the valves that are arranged in the pipes by which the apparatus is adapted to connect with the boiler shown as open. Fig. 4 is another central and vertical section taken on the line $x'\ x'$ of Fig. 2, with the valves in the pipes, by which latter the apparatus connects with a boiler, illustrated as closed. Fig. 5 is a transverse section taken on the line $x^2\ x^2$ of Fig. 1, showing the upper one of the two pipes by which the apparatus connects with the boiler, said pipe having the valve therein shown as open. Fig. 6 is a transverse section taken on the line $x^5\ x^5$ of Fig. 1, showing the lower horizontal pipe of the device, by which the latter connects with a steam-boiler, with the valve in this pipe shown as closed. Both of these pipes (shown in transverse section at Figs. 5 and 6) have the same construction of valves, and these valves are arranged to be operated together. The upper one of these horizontally-arranged pipes (shown at Fig. 5) is extended laterally from the device at the upper end of the latter to connect with the boiler where above the desired water-line in the latter, and the other horizontal pipe, as shown at Fig. 6, is laterally projected from the lower end of the device to connect with the boiler at a point below the desired water-line in the boiler, with both of these pipes arranged to be vertically in line. Fig. 7 is a transverse section taken on the line $x^3\ x^3$ of Fig. 3, with the parts therein shown as having the position they occupy when the valves in the horizontal pipes connecting with the boiler are open. Fig. 8 is another section taken on the line $x^4\ x^4$ of Fig. 4, showing the same parts that are shown at Fig. 7, but in the position they occupy when the valves in the horizontal pipes are closed. Fig. 8 is a top view of the hand-wheel which operates the rotating cam-rod, this illustration showing as formed upon the top of the hand-wheel an indicating-quadrant. Fig. 9 is another top view of the hand-wheel shown at Fig. 8, but with the indicating-quadrant in another and differing position from that in which it is shown at Fig. 8.

The several parts of the apparatus thus illustrated are designated by letter reference, and the function of the parts is described as follows:

The letter P designates the stand-pipe, which is interiorly provided with a rotating cam-rod $P^2$, provided with a stem S, having a hand-wheel H on its upper end, with the stem passing through an end plug N, a gland or stuffing-box G, and an inclosing cap C. This cam-rod $P^2$ at each of its ends has a journal part $p^2$, by which it is adapted to be rotated within the interior I of the stand-pipe as a bearing when actuated by the hand-wheel H. This cam-rod is cut away circumferentially between its journal parts $p^2$, so as to have the cam-rod part $p^3$ eccentric to the rotating center of the cam-rod and the interior I of the stand-pipe, with this eccentricity greater upon that side of the cam-rod indicated at $p^4$ than upon that side of the cam-rod designated at $p^5$ and with that side of the cam-rod having the smallest measure of eccentricity, having the latter made to extend upon the cam-rod side from a point at the top and bottom between the center of the valve-stems $v^2$ of each of the valves V, of which there is one arranged in each of the horizontal pipes J, which connect the apparatus with the boiler on which it is to be used. Each of these valves V has an encircling flange $v^3$, provided with a beveled face $v^4$, adapted to seat against a beveled shoulder $h$, formed in each of the pipes J, with the valve-stems $v^2$ each having a slideway $w$ formed in that one of the pipes J in which the valve is located.

The letter $d$ designates a stop-pin that upwardly projects from the bottom of the stand-pipe interior I, and the letter D designates a segment formed on the bottom of the cam-rod $P^2$, whereby when the latter is being rotated it will when reaching the stop-pin $d$ be arrested in its movement, and by which stop-pin and segments as thus constructed and arranged, the movement of the cam-rod in its rotation is regulated.

The letters A A designate arms that are projected laterally from the stand-pipe P to be at right angles to the pipes J, which connect the apparatus with the boiler with which it is arranged to coöperate. These arms A A are arranged to be vertically in line with each other, and they each connect with the interior I of the stand-pipe P by means of the horizontal passage $a^2$, formed in each of these arms.

The letters K designate cups, of which there is one integrally formed upon the outer end of each of these arms A, that one of them upon the upper one of the arms A being inverted, and they have each a passage-way connecting with the passage-way $a^2$ of each of these arms.

The letter L designates a plate that is curved in cross-section, and at each of its ends it connects with one of the cups K on the inner side of the latter.

The letter T designates a glass tube, each of the open ends of which is entered within one of the cups K in front of the plate L and therein arranged to make a steam-tight connection, the glass tube so placed and arranged connecting with the boiler at each end of the tube by means of one of the arms A and the one of the pipes J, and by which connection there will be indicated by the height of the water in the glass tube the level of the water in the boiler.

The letter $m$ designates a try-cock that is located upon the lower end of the cup K, which is attached to the lower one of the arms A.

To the foregoing parts, considered independently of the cam-rod $P^2$, its construction, and operation in combination therewith, I make no claim, as it sometimes occurs that a water-gage attachment to boilers constructed to automatically close when the glass tube is broken will also close from other causes, particularly when used upon automobile vehicles, where a heavy jar or surging of the water in the boiler may operate in the same manner as an escaping pressure to close the valves of the pipes leading from the boiler to the gage, and thus prevent the latter from indicating the proper level of the water in the boiler, thereby endangering the burning out of the tubes of the latter. It is the object and purpose of my invention to combine with water-gages of this class a means whereby it can be readily determined whether the valves in the pipes connecting the gage with the boiler are operating properly, and to accomplish these improved results I have combined with a water-gage constructed to automatically close when the glass tube is broken the mechanism hereinbefore described and which is operated as follows.

When it is desired to ascertain whether the water-gage is operating properly, the cam-rod is turned by the hand-wheel H until that part of the cam-rod having the least eccentricity to the stand-pipe interior will bear upon the inner ends of the valve-stems $v^2$ of the valves V to hold them open, with the parts appearing as at Figs. 3 and 5 and with the segment D on the lower end of the cam-rod engaging with the stop-pin $d$, as shown at Fig. 7, the position of the parts thus placed being indicated by the quadrant upon the top of the hand-wheel, with the arm $q^2$ of the quadrant vertically in line with the passage $j^2$ of the pipes J and the quadrant-arm $q^3$ in vertical alinement with the passages $a^2$ of the arms A. With the parts thus placed the try-cock $m$ is now opened, and if the valves V are in a position to act properly water will flow from the boiler freely through the tube T. This having been determined, the try-cock is closed and the cam-rod $P^2$ is now rotated away from the valves V, with the latter left open and, as shown by the dotted line $b$ of Fig. 6, with the rotation of the cam-rod continued until the segment D reaches the stop-pin $d$, as shown at Fig. 8, the quadrant on the hand-wheel showing just the reverse position to that in which the parts must be to hold the valves V open. The valves V thus left open are in a condition to automatically close by the impulse of an escaping pressure caused by the breaking of the glass gage-tube.

Having thus described my invention, what I claim, and desire to secure by Letters Patent, is—

1. The combination with a water-line gage having a try-cock at its lower end, of a stand-pipe having laterally-arranged arms connecting it interiorly with said gage, and having also an upper and a lower laterally-arranged connecting-pipe each provided with a valve, the upper one of these last-named pipes being adapted to connect with a steam-boiler above the desired water-line thereof, and the other of said pipes adapted to connect with a boiler below the desired water-line thereof;

a cam-rod which at each of its ends is adapted to journal within said stand-pipe, and between where thus journaled cut away eccentrically; and a stop in the lower end of said stand-pipe; and means substantially as described whereby said cam-rod may be rotated within said stand-pipe, as regulated by said stop to hold open the valves in the lateral pipes, substantially as, and for the purposes set forth.

2. The combination with the gage T, arranged within the outer ends of the arms A, A, and provided with the try-cock $m$, of the stand-pipe P, having the stop-pin $d$, upwardly projected from its lower end and connecting with the arms A, A; the cam-rod $P^2$, provided with the hand-wheel H, and the journal parts $p^2$, $p^2$, and cut away eccentrically to said stand-pipe interior between its end journals, and provided with the segment D, upon its lower end; and the pipes J, J, each provided with the valve V, having the stem $v^2$, and adapted to connect said stand-pipe to a steam-boiler, substantially as, and for the purposes set forth.

3. The combination with a water-line gage having a try-cock at its lower end, of a stand-pipe connected interiorly to said gage at each of its ends; a laterally-arranged and interiorly-connected steam-pipe at each end of said stand-pipe provided with a valve; one of said steam-pipes being adapted to connect with a steam-boiler above the water-line, and the other steam-pipe adapted to connect with a steam-boiler below the water-line thereof; a cam-rod arranged to journal at each of its ends within said stand-pipe, and between where thus journaled to be cut away eccentrically; means substantially as described whereby said cam-rod may be rotated within said stand-pipe to engage with, and hold open said valves for the passage of water from the gage through the try-cock; and a stop in the bottom of said stand-pipe whereby the rotation of said piston may be regulated, substantially as, and for the purposes set forth.

Signed at the city of Troy, New York, this 10th day of July, 1900, and in the presence of the two witnesses whose names are hereto written.

WALTER OSGOOD KNOWLSON.

Witnesses:
 CHARLES S. BRINTNALL,
 W. E. HAGAN.